Figure 1:
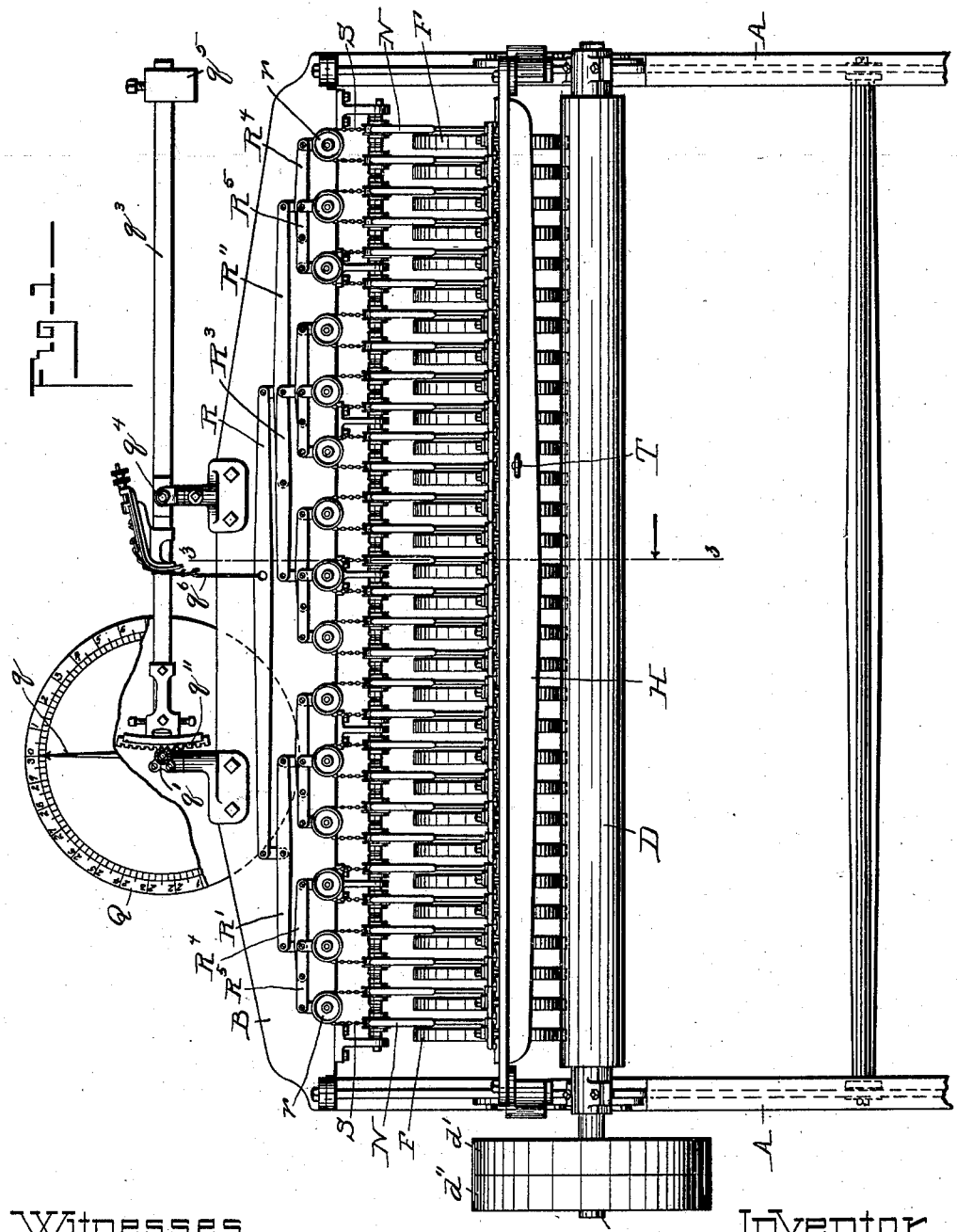

No. 657,444. Patented Sept. 4, 1900.
J. E. NIGHTINGALE.
MACHINE FOR MEASURING AREAS OF SURFACES.
(Application filed May 1, 1900.)

(No Model.) 6 Sheets—Sheet 1.

No. 657,444. Patented Sept. 4, 1900.
J. E. NIGHTINGALE.
MACHINE FOR MEASURING AREAS OF SURFACES.
(Application filed May 1, 1900.)

(No Model.) 6 Sheets—Sheet 2.

Witnesses
Louis Dunker.
Charles F. Logan

Inventor
Josiah E. Nightingale
by Alvan Andrew
his atty.

THE NORRIS PETERS CO., PHOTO-LITHO., WASHINGTON, D. C.

No. 657,444. Patented Sept. 4, 1900.
J. E. NIGHTINGALE.
MACHINE FOR MEASURING AREAS OF SURFACES.
(Application filed May 1, 1900.)

(No Model.) 6 Sheets—Sheet 4.

Witnesses
Inventor
Josiah E. Nightingale
by Alvan Andrew
his atty

THE NORRIS PETERS CO., PHOTO-LITHO., WASHINGTON, D. C.

No. 657,444. Patented Sept. 4, 1900.
J. E. NIGHTINGALE.
MACHINE FOR MEASURING AREAS OF SURFACES.
(Application filed May 1, 1900.)
(No Model.) 6 Sheets—Sheet 5.
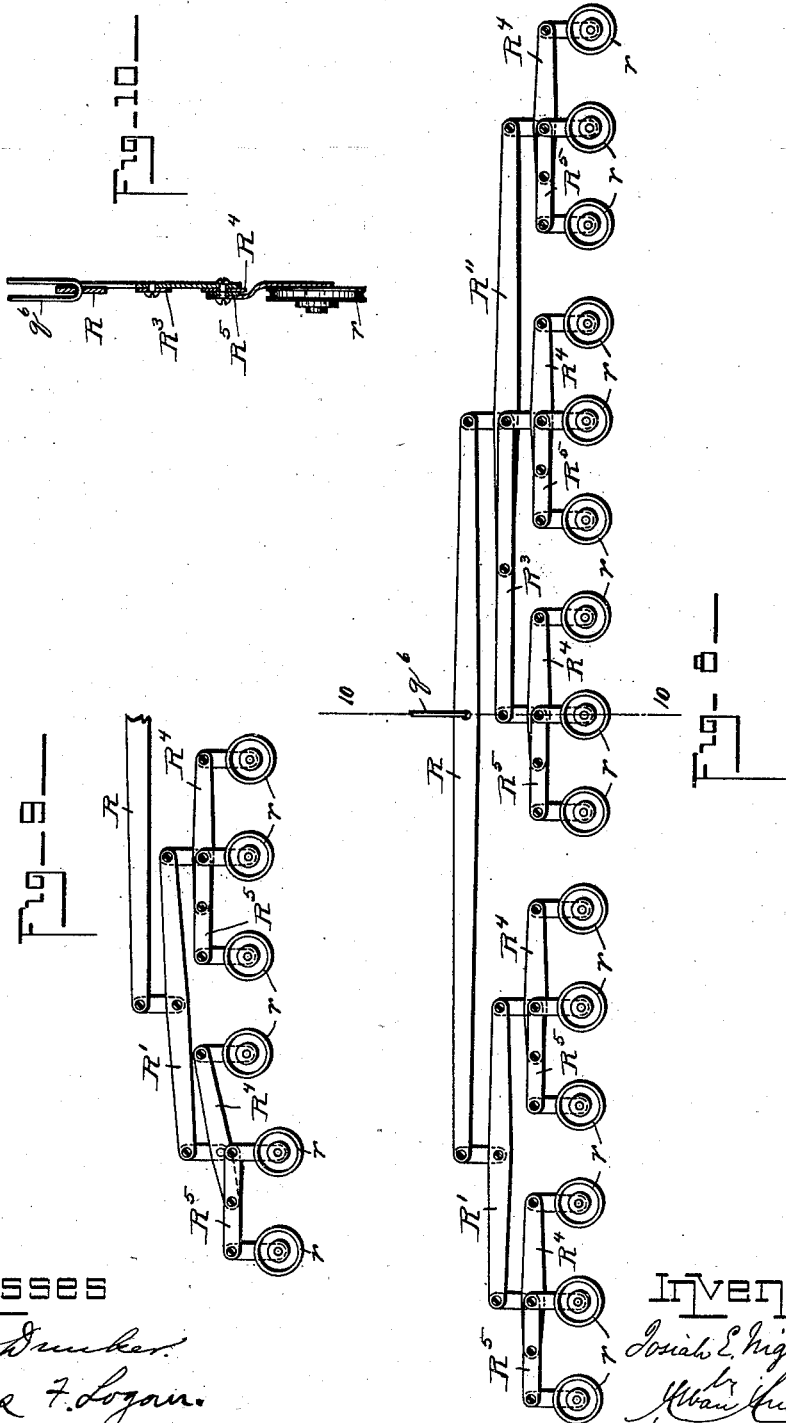
Witnesses
Inventor
Josiah E. Nightingale
his atty No. 657,444. Patented Sept. 4, 1900.
J. E. NIGHTINGALE.
MACHINE FOR MEASURING AREAS OF SURFACES.
(Application filed May 1, 1900.)
(No Model.) 6 Sheets—Sheet 6.
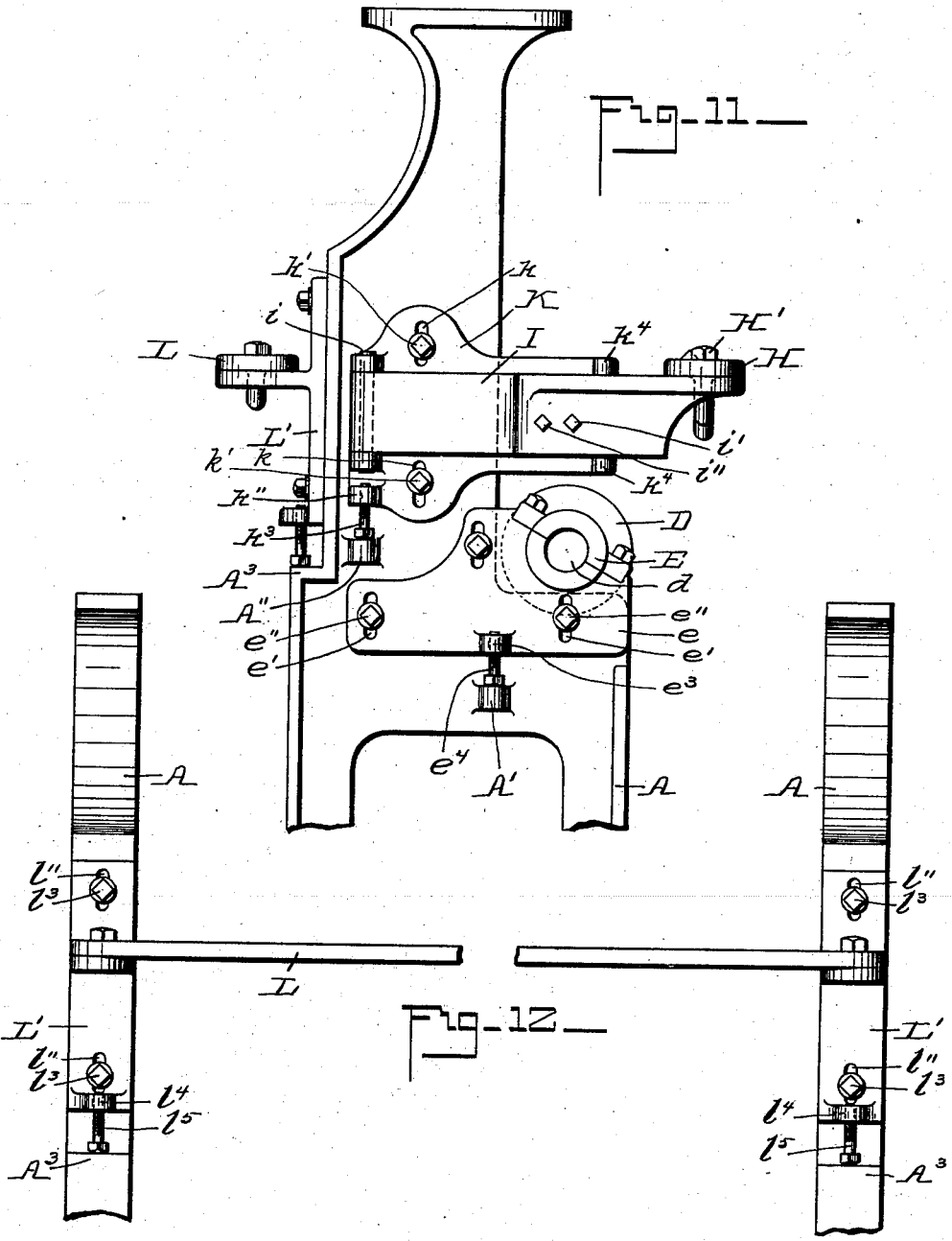
Witnesses
Louis Dunker.
Charles F. Logan
Inventor
Josiah E. Nightingale
by _____
his atty

UNITED STATES PATENT OFFICE.

JOSIAH E. NIGHTINGALE, OF DANVERS, MASSACHUSETTS.

MACHINE FOR MEASURING AREAS OF SURFACES.

SPECIFICATION forming part of Letters Patent No. 657,444, dated September 4, 1900.

Application filed May 1, 1900. Serial No. 15,052. (No model.)

*To all whom it may concern:*

Be it known that I, JOSIAH E. NIGHTINGALE, a citizen of the United States, residing at Danvers, in the county of Essex and State of Massachusetts, have invented new and useful Improvements in Machines for Measuring the Areas of Surfaces, of which the following is a specification.

This invention relates to improvements in machines for measuring the areas of surfaces of the kind shown and described in the United States Letters Patent granted to William A. Sawyer April 4, 1882, No. 256,058; January 2, 1883, No. 269,962; October 2, 1883, No. 286,078; November 3, 1885, No. 329,596, and November 3, 1885, No. 329,597; and it consists in arrangements of the levers which connect the indicating device with the segments for the purpose of simplifying the measuring device by using a less number of parts in a given length to measure the given area; also, in means for longitudinally adjusting the front cross-bar, to which the frames or yokes containing the journaled measuring-wheels are pivoted for the purpose of longitudinally adjusting the pinions of the measuring-wheels properly relative to the toothed segments; also, in means for vertically adjusting the front cross-bar for the purpose of causing the pinions to be held disengaged from the segments at all times when no hide or skin passes between the feed-roll and measuring-wheels and to cause an engagement between such pinions and segments the moment a skin or hide is fed between said feed-roll and measuring-wheels; also, in means for vertically adjusting the feed-roll relative to the measuring-wheels, so as to compensate for variations in the thickness of the hides or skins, to allow all the measuring-wheels to drop simultaneously in contact with the feed-roll and to cause all the pinions to spread open from the segments when the skin or hide is not fed between said feed-roll and measuring-wheels; also, in means for vertically adjusting the back bar and its rod, upon which the pawls are hung for the purpose of properly adjusting the pawls for engagements with the segments; also, in a novel construction of the yokes or frames in which the measuring-wheels and pinions are journaled for the purpose of supporting the axle of each of said measuring-wheels and pinions in bearings in both ends of said axle, one at the side of the wheel and one at the side of the pinion, for the purpose of preventing said arm or yoke from being twisted, and thus causing the wheel to move in a true vertical plane and causing the pinion to properly engage with its segment where a hide or skin is passed between the feed-roll and the measuring-wheels, and also in a novel construction of the pawls which engage the segments for the purpose of enabling said pawls to be readily removed from the rod on which they are hung whenever it is desired to repair or sharpen said pawls without the removal of any of the pins on the rod which locate the pawls in position relative to the segments.

The invention is carried out as follows, reference being had to the accompanying drawings, wherein—

Figure 2:
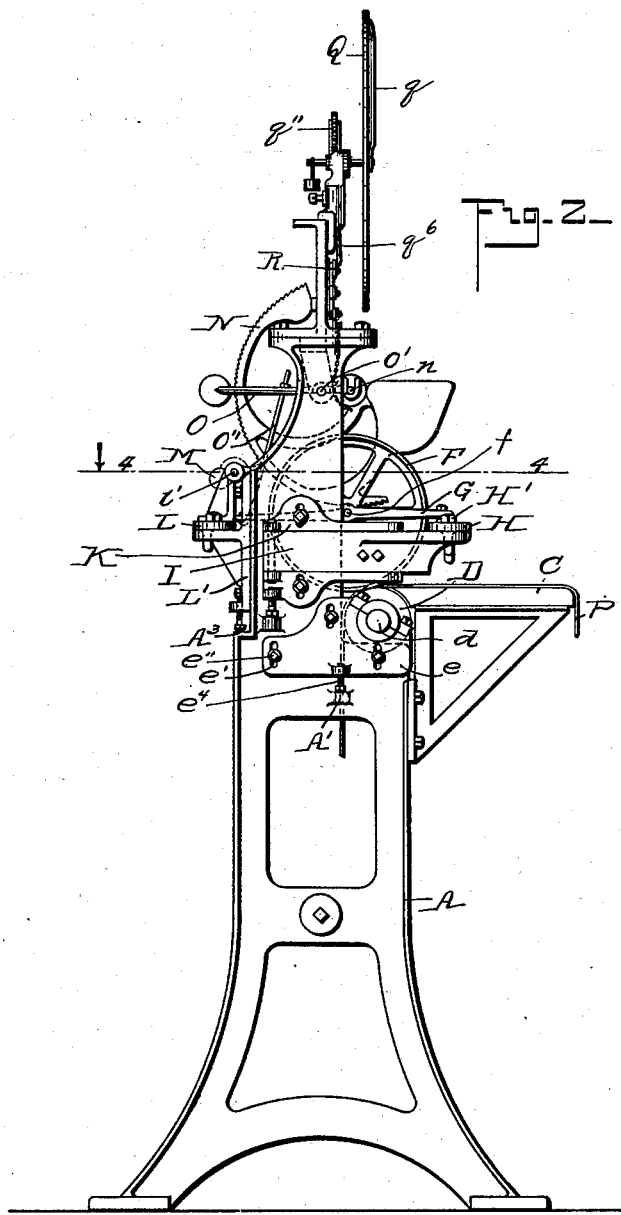
Figure 3:
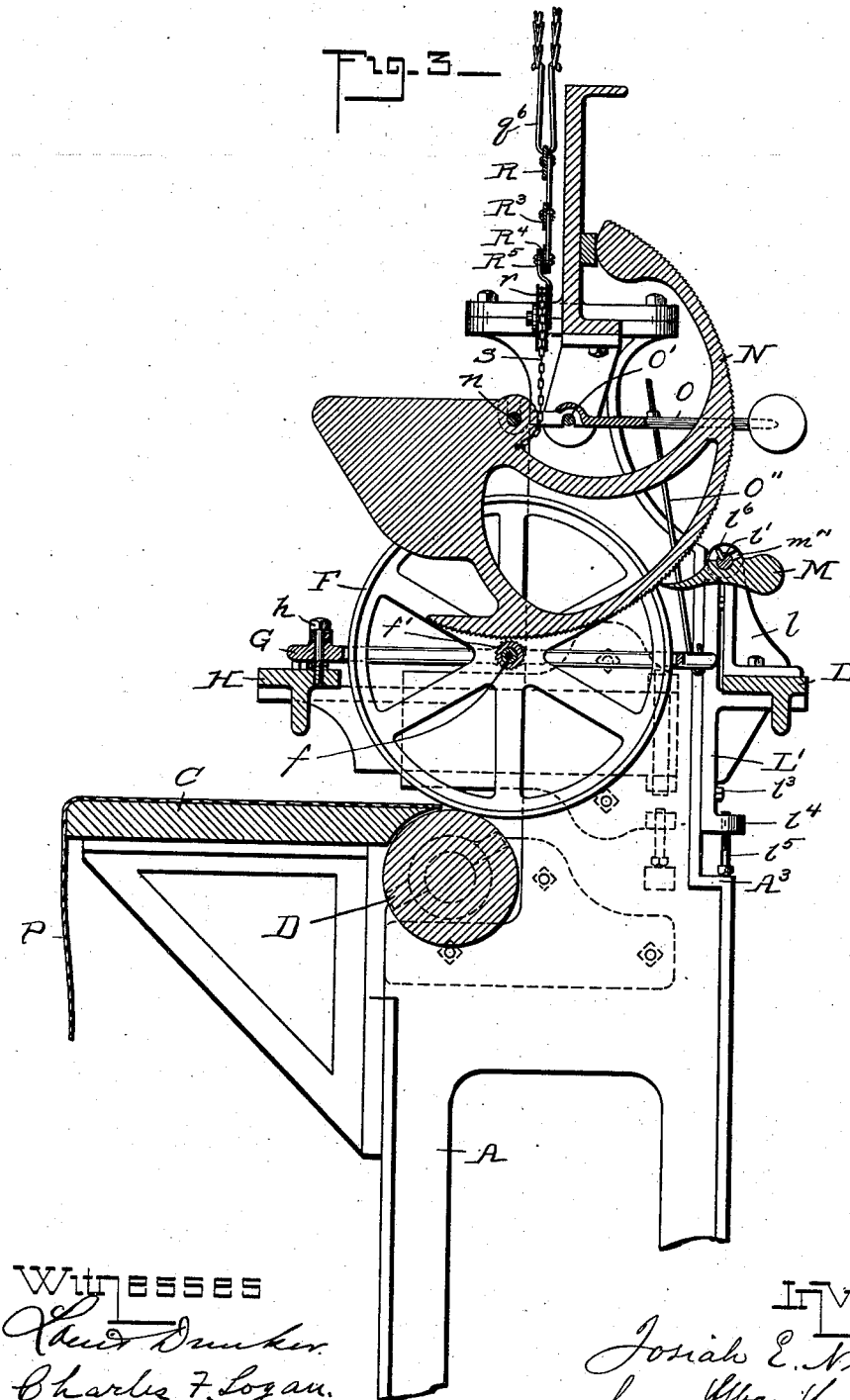
Figure 4:
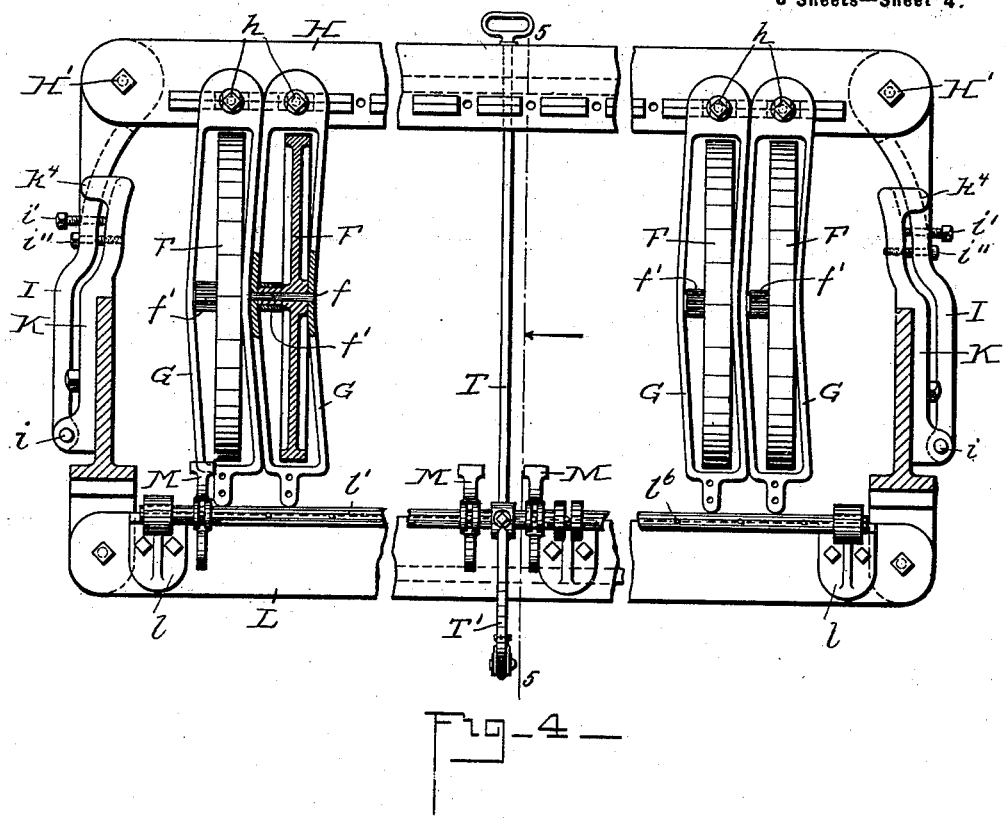
Figure 5:
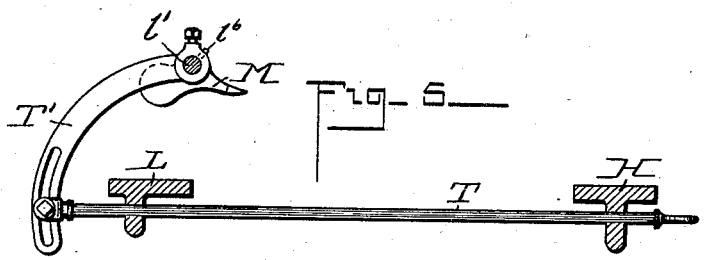
Figure 6:
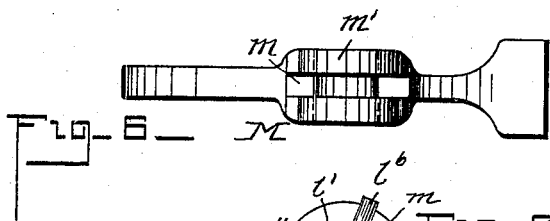
Figure 7:
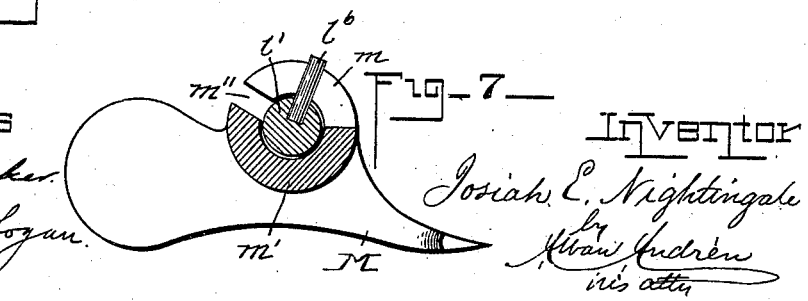

Figure 1 represents a front elevation of the machine. Fig. 2 represents an end elevation of the same as seen from X in Fig. 1, the driving-wheels being omitted. Fig. 3 represents a cross-section on the line 3 3 shown in Fig. 1. Fig. 4 represents a horizontal section on the line 4 4 in Fig. 2, parts being shown in elevation. Fig. 5 represents a detail cross-section on the line 5 5 in Fig. 4, showing the pawl-releasing device. Fig. 6 represents a detail top plan view of one of the pawls which engage the segments. Fig. 7 represents a side view, partly in section, of Fig. 6. Fig. 8 represents a detail front view of the levers arranged between the measuring and indicating devices. Fig. 9 represents a partial view of said levers, showing some of their pulleys drawn down. Fig. 10 represents a cross-section on the line 10 10 shown in Fig. 8. Fig. 11 represents a detail side elevation showing the adjusting mechanism of the front and back bars and axle of the feed-roll; and Fig. 12 represents a partial rear view of the machine, showing the mechanism for vertically adjusting the back bar.

Similar letters refer to similar parts wherever they occur on the different parts of the drawings.

A A represent the upright end frames, which are secured at a proper distance apart by suitable stays or braces. To the upper ends of said frames is secured the cross-bar B, which serves as a support for the dial and indicating devices, as is common in machines of this kind.

C is the work-supporting table, secured to the front portions of the frames A A, as usual.

D is the feed-roller, secured to the shaft $d$, which latter is journaled in bearings E E. (Shown in detail in Fig. 11.) To the feed-roll shaft $d$ is secured a pulley $d'$, to which a rotary motion is imparted by means of belt-power, as usual. $d''$ is a loose pulley on said shaft in the ordinary manner. Each of such bearings is made integral with a plate or bracket $e$, secured in a vertically-adjustable manner to the end frame A. In practice I prefer to make slotted perforations $e'\ e'\ e'$ in said plate $e$, adapted to receive fastening-screws $e''\ e''\ e''$, which are screwed into the frame A and serve to clamp the plate or bracket $e$ in position on said frame A after being adjusted thereon. For the purpose of preventing said plate or bracket $e$ from working loose, as well as for the purpose of adjusting it in a vertical position, I prefer to provide it with an ear $e^3$, in which is screwed an adjusting-screw $e^4$, the head or lower end of which is adapted to rest on an ear or projection $A'$ on the frame A, as shown in detail in Fig. 11.

By the arrangement just described provision is made whereby the feed-roll may be adjusted by being moved to or away from the measuring-wheel, and this is an important provision, as thereby variations in the thickness of hides or skins to be measured are compensated for. It will be found in the ordinary course of business that hides of different thickness are to be measured, and sometimes a number of hides which are quite thin are required to be measured in the machine, in which case the feed-roll is moved toward the measuring-wheel the requisite distance. Again, a batch of very thick hide is to be measured, and then the measuring-roll may be moved away from the measuring-wheel to accommodate the thickness of the hide. In the absence of the facility for so adjusting the feed-roll the machine, when the feed-roll is at a given distance from the measuring-wheel suitable for comparatively-thin hide, could not well measure thick hides, as they would crowd the pinion on the measuring-wheel too tightly into the teeth of the segments N, hereinafter referred to, presenting a possibility of a stoppage of the machine and a slow and unsatisfactory working through and measuring of the hide. By providing the machine with the feed-roll so arranged that it may be moved relatively to the peripheries of the measuring-wheels the machine may be adjusted in this particular so as to permit the hide passing quickly and smoothly through the machine and facilitating an accurate measurement thereof.

F F are the measuring-wheels, each attached to a spindle $f$, to which is also attached a small pinion $f'$, as usual. Said measuring-wheels are normally held by gravity against the feed-roller D, as shown in Fig. 3. The ends of the spindle $f$ are journaled in the skeleton yoke G, which is made rectangular, or nearly so, in shape, so as to inclose both the measuring-wheel and its pinion, by which arrangement the spindle $f$ is supported and journaled in both of its outer ends, one at the side of the measuring-wheel F and one at the side of the pinion $f'$, by which the said yoke is prevented from being twisted while it is raised or lowered and caused to move in a true vertical plane during such adjustment, as hereinbefore stated. The front end of each yoke or frame G is pivotally connected, by means of a screw-bolt $h$, to the front cross-bar H, as is common in machines of this kind. The screw-bolt $h$ fits loosely in a hole or perforation in the frame G, permitting pivotal movement of the latter on the bolt. The said front cross-bar H is longitudinally and vertically adjustable for the purpose hereinabove stated, and the said adjusting device is constructed as follows: The ends of the said cross-bar H are pivotally connected at $H'\ H'$ to levers or arms I I, each of which is pivoted in its rear end at $i$ to a plate or bracket K, which is vertically adjustable on the upright frame A, as shown in Fig. 11. The plate or bracket K is provided with slotted perforations $k\ k$, adapted to receive fastening-screws $k'\ k'$, which are screwed into the frame A. For the purpose of holding the said bracket or plate K in position after being vertically adjusted as well as adjusting it I prefer to make on it an ear or projection $k''$, through which is screwed an adjusting-screw $k^3$, the head or lower end of which is adapted to rest on a higher projection $A''$ on the frame A, as shown in Fig. 11. The outer end of each lever or arm I is guided between lugs or ears $k^4\ k^4$. (Shown in Figs. 4 and 11.) The levers or arms I I and the front cross-bar H, pivotally connected thereto, are adjusted in a horizontal direction by means of screws $i'\ i'''$. (Shown in Figs. 4 and 11.) The screws $i'$ are screwed through the levers I and have their inner ends bearing against the outside of the plates K. The screws $i''$ pass loosely through perforations in the levers I and are screwed into perforations in the plates K, as shown in Fig. 4. It will readily be seen that by adjusting the position of said screws $i'\ i''\ i'\ i''$ the front cross-bar H can readily be adjusted longitudinally for the purpose set forth.

L is the back bar, having secured to it bearings $l\ l$, which carry the rod $l'$ on which the pawls M, that engage the toothed segments N, are hung. It is desirable in machines of this kind that said pawls should be capable of proper adjustment relative to the said segments, so as to cause said pawls to properly engage the segments, and for this purpose I make the said back bar L vertically adjustable, preferably by securing its ends to brackets $L'\ L'$, which are provided with slotted perforations $l''\,l''$, through which pass the fastening-screws $l^3\,l^3$, the inner ends of which are screwed into the rear portions of the frames A A, as shown in Fig. 12.

In practice I prefer to make on each bracket L' a lug or ear $l^4$, through which is screwed a regulating and rest screw $l^5$, the lower end or head of which rests against a projection $A^3$ on the frame A, as shown in Figs. 3, 11, and 12.

In the arrangement just described, by which the proper adjustment of the pawls may be secured, it is important that said pawls shall be so arranged in connection with the segments N that they shall have a nice engagement therewith, as otherwise there may be a misoperation of the machine or part thereof while the hide is passing through, which would cause an imperfect measurement thereof. According to my invention, however, the pawls when strung upon the rod $l'$ may be adjusted as may be necessary to or away from the toothed segments to the proper position in which they will engage the same accurately and with nicety. Furthermore, in the event, as will occur in constant use of the machine, the noses of the pawls which engage the teeth of the segments become worn it is not necessary to remove the pawls; but by properly adjusting the back bar L the worn pawls may be brought into the proper engagement with the teeth of the segments.

I have shown in the drawings and described in this specification certain mechanical means in machines of this kind for vertically adjusting the feed-roller, for vertically and horizontally adjusting the front bar, and for vertically adjusting the back bar, and although such mechanism is preferable I desire to state that I do not wish to confine myself to such exact mechanism for adjusting the said parts, as other well-known devices and mechanism may be used for such purposes without departing from the essence of my invention.

In machines of this kind the pawls M, that engage the segments N, are pivotally arranged upon a rod $l'$ and located at a proper distance apart by means of pins $l^6$, secured to said rod and projecting each into a slot $m$ in the hub $m'$ of said pawl. It is often necessary to remove one or more of said pawls from the supporting-rod for the purpose of sharpening or repairing said pawls, and this could heretofore only be accomplished by the removal of the guide-pins from the supporting-rod, which is a very difficult operation. To avoid such objection and to enable the pawls to be readily removed from the said roll and replaced thereon after being sharpened or repaired, I construct the said pawls as follows: I make on one side of the hub $m'$ of the pawl a cut-away portion $m''$ large enough to permit the pin $l^6$ to pass through it when the pawl is being turned and moved longitudinally on the rod $l'$. To remove one or more of the pawls, it is only necessary to remove one or more of the rod-bearings $l$, after which the pawls are turned on the rod $l'$, so that the cut-away portion $m''$ on the pawl coincides or comes in alinement with the pins $l^6$, when the pawl or pawls may readily be withdrawn from the rod $l'$ and as readily be replaced thereon after being repaired or sharpened. Each segment N has its spindle $n$ journaled in the end of a lever O, which is hung at O' and connected to the yoke or frame G for the measuring-wheel F by means of a rod O'', as is common in devices of this kind.

P in Figs. 2 and 3 represents the hide or skin the area of which is to be measured while it is passed between the feed-roll and measuring-wheels.

Q is the graduated dial, secured in a suitable manner to the upper cross-beam B. $q$ is the index, secured to the shaft of the pinion $q'$, the teeth of which mesh in the teeth of the segment $q''$ on one end of the beam $q^3$, which is pivoted at $q^4$ and provided with a balance-weight $q^5$, as is common in devices of this kind. In connection with said indicating device I use a system of levers intermediate between the beam $q^3$ and the segments N, and said lever system is arranged with a view of simplifying the measuring device by using a less number of parts in a given length to measure a given area. The said lever system is constructed and carried out as follows: $q^6$ is a link connected in a suitable manner to the beam $q^3$ and pivotally connected in its lower end to the lever R, as is common in measuring-machines of this kind. The longer end of the lever R is pivotally connected to a lever R'. The shorter end of the lever R is pivotally connected to a lever R'', and to the shorter end of the latter is pivotally connected a lever $R^3$, similar to the one marked R' on the longer end of the lever R. The ends of the levers R' $R^3$, as well as the longer end of the lever R'', are pivotally connected to levers $R^4$. The shorter ends of the levers $R^4$ are pivotally connected to levers $R^5$, from the ends of which are suspended the pulleys $r\,r$. Similar pulleys are also suspended from the longer ends of the levers $R^4$, as shown in Figs. 1, 8, 9, and 10. Over each pulley $r$ is carried a chain S, the lower ends of which are secured to the hubs of two adjacent segments N in the series, as shown in Figs. 1 and 3. By this arrangement of levers, as above stated, the system is simplified, and I am thereby enabled to use a less number of parts in a given length for accurately measuring a given area.

The operation of the machine is similar to that shown and described in the aforesaid Sawyer patents. After the skin or hide has passed between the feed-roller and the measuring-wheels and the measured surface indicated upon the dial the pawls M are released from engagement with the segments by rocking the pawl-shaft $l'$, which is accomplished by pushing back a rod T, which is guided in the front and back bars H L and connected at its rear end to a curved lever T', that is secured to the pawl-shaft $l'$, as shown in Fig.

5, causing all the segments to resume their normal positions, after which the rod T is pulled forward preparatory to measuring another hide or skin, and so on during the operation of the machine.

What I wish to secure by Letters Patent and claim is—

1. In a machine for measuring the area of surfaces, a system of levers, composed of a main lever R, having a long and short arm, a lever R', pivotally connected to the longer arm of lever R, a lever R'', having a long and short arm, pivotally connected to the short arm of the lever R, a lever R³, pivotally connected to the short arm of the lever R'', a series of levers R⁴, having each a long and short arm pivotally connected to opposite ends of the levers R', R³ and to the longer arm of lever R'' a series of levers R⁵, pivotally connected to the shorter arms of the levers R⁴, and a series of pulleys r, r, suspended from the ends of the levers R⁵, and the longer arms of the levers R⁴, and chains or cords S, leading from the pulleys r, to the hubs of the segments N, substantially as and for the purpose set forth.

2. In a machine for measuring the areas of surfaces, the combination with segments, of a front cross-bar H, longitudinally adjustable relative to the frame of the machine, a series of yokes or frames G, pivotally connected to said adjustable cross-bar, and a measuring-wheel and pinion journaled in each of said yokes or frames, all so arranged that the pinions of the measuring-wheels may be adjusted relative to the segments, substantially as and for the purpose set forth.

3. In a machine for measuring the areas of surfaces, the combination with segments, of a front cross-bar H, vertically adjustable upon the frame of the machine, a series of yokes or frames G, pivotally connected to said cross-bar, and a measuring-wheel and pinion journaled in each of said yokes or frames, all so arranged that the position of the pinions may be adjusted properly relative to the segments, substantially as herein set forth and described.

4. In a machine for measuring the areas of surfaces, the combination of a series of toothed segments, a vertically-adjustable bracket carried on the frame of the machine in which is mounted a feed-roller, a series of pivoted yokes or frames located between the toothed segments and the feed-roller, and a series of measuring-wheels arranged in said yokes and normally resting upon said feed-roller, and a series of pinions on the axles of said measuring-wheels adapted to engage the teeth of the respective segments, substantially as described.

5. In a machine for measuring the areas of surfaces, in combination, a series of segments, a series of pawls engaging the latter, a shaft on which said pawls are hung, a bracket, a back cross-bar L, mounted in said bracket and carrying said shaft and pawls, and means for vertically adjusting said bracket and the cross-bar mounted therein, so as to cause a proper engagement of said pawls with the segments substantially as and for the purpose set forth.

6. In a machine for measuring the areas of surfaces, in combination, a series of toothed segments, a pawl-supporting rod having pins $l^6$ adapted to be received in longitudinal recesses m, on the pawls M, mounted on said rod, each of said pawls having a transverse cut-away portion $m''$, for the purpose of enabling said pawls to be readily removed from and replaced upon said rod, without removing the pins $l^6$, substantially as herein set forth and described.

In testimony whereof I have hereunto set my hand in presence of two subscribing witnesses.

JOSIAH E. NIGHTINGALE.

Witnesses:
 ALBAN ANDRÉN,
 CHARLES F. LOGAN.